May 26, 1970

R. E. SWITZER ETAL 3,513,524

MULTI-CONDUCTOR HOLDING APPARATUS

Filed Aug. 14, 1967

INVENTORS.
RONALD E. SWITZER
DONALD R. ALLAN
BY
Lyon & Lyon
ATTORNEYS

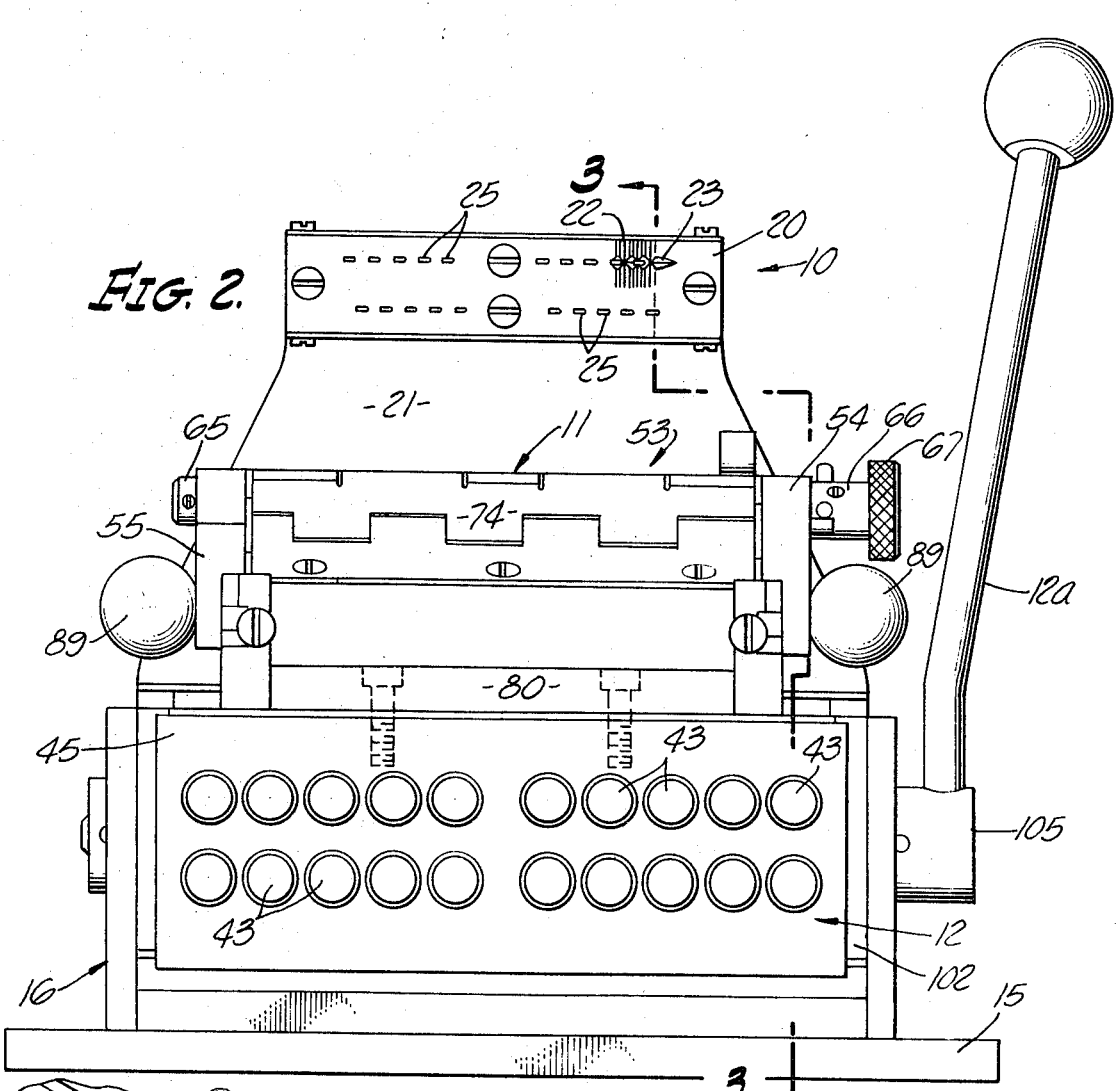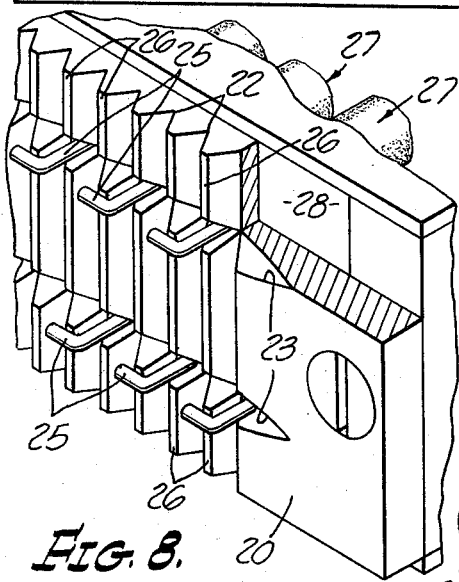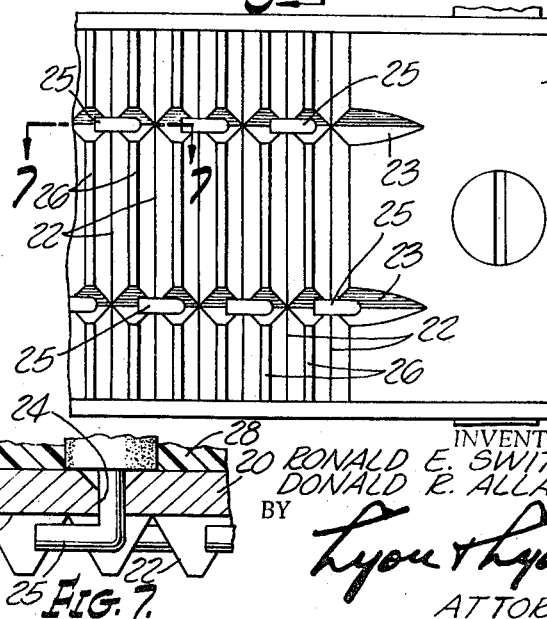

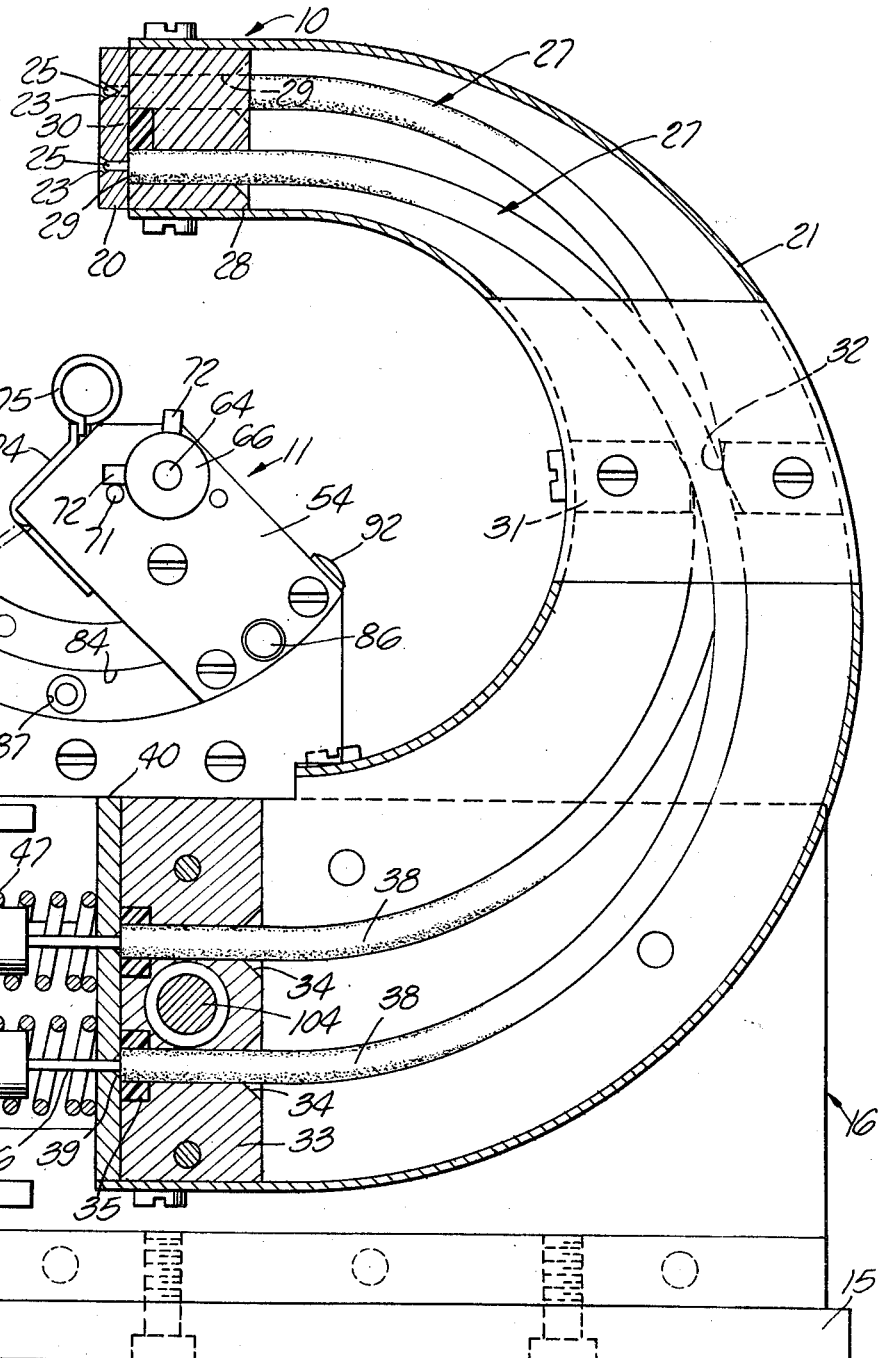
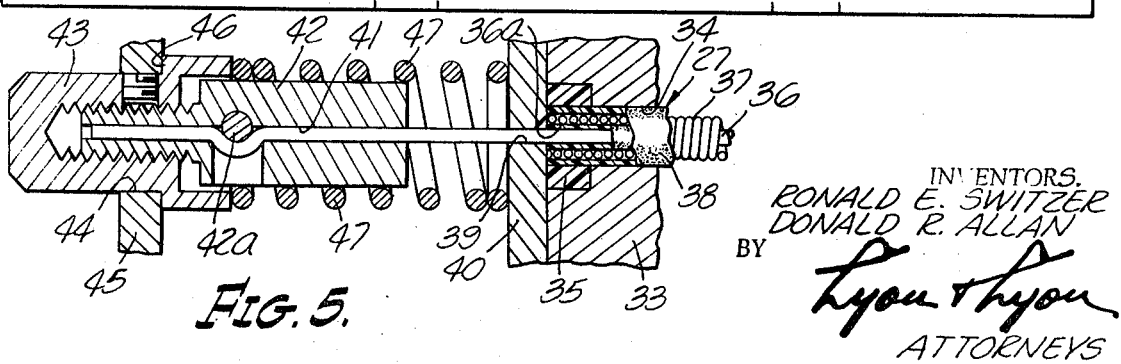

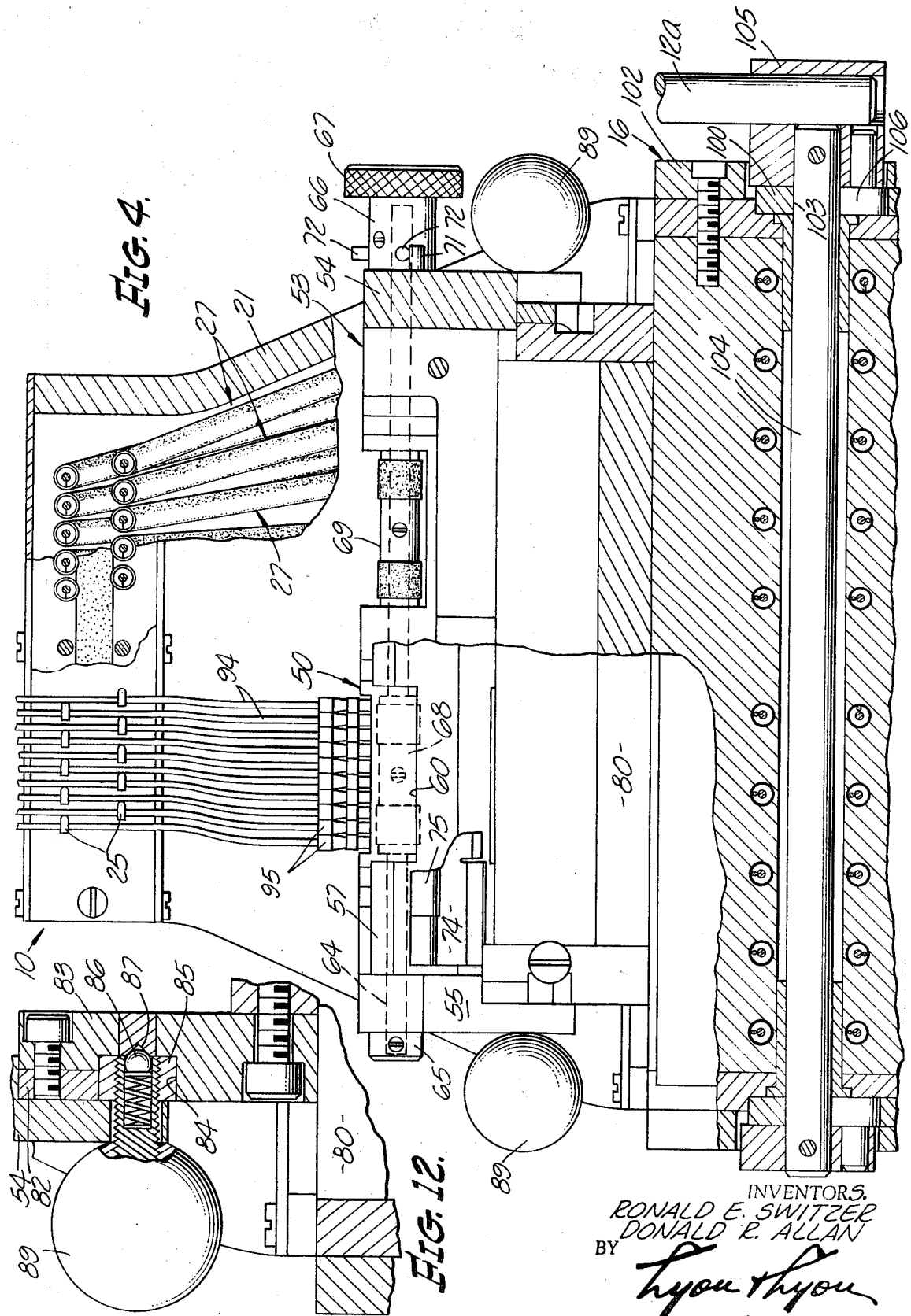

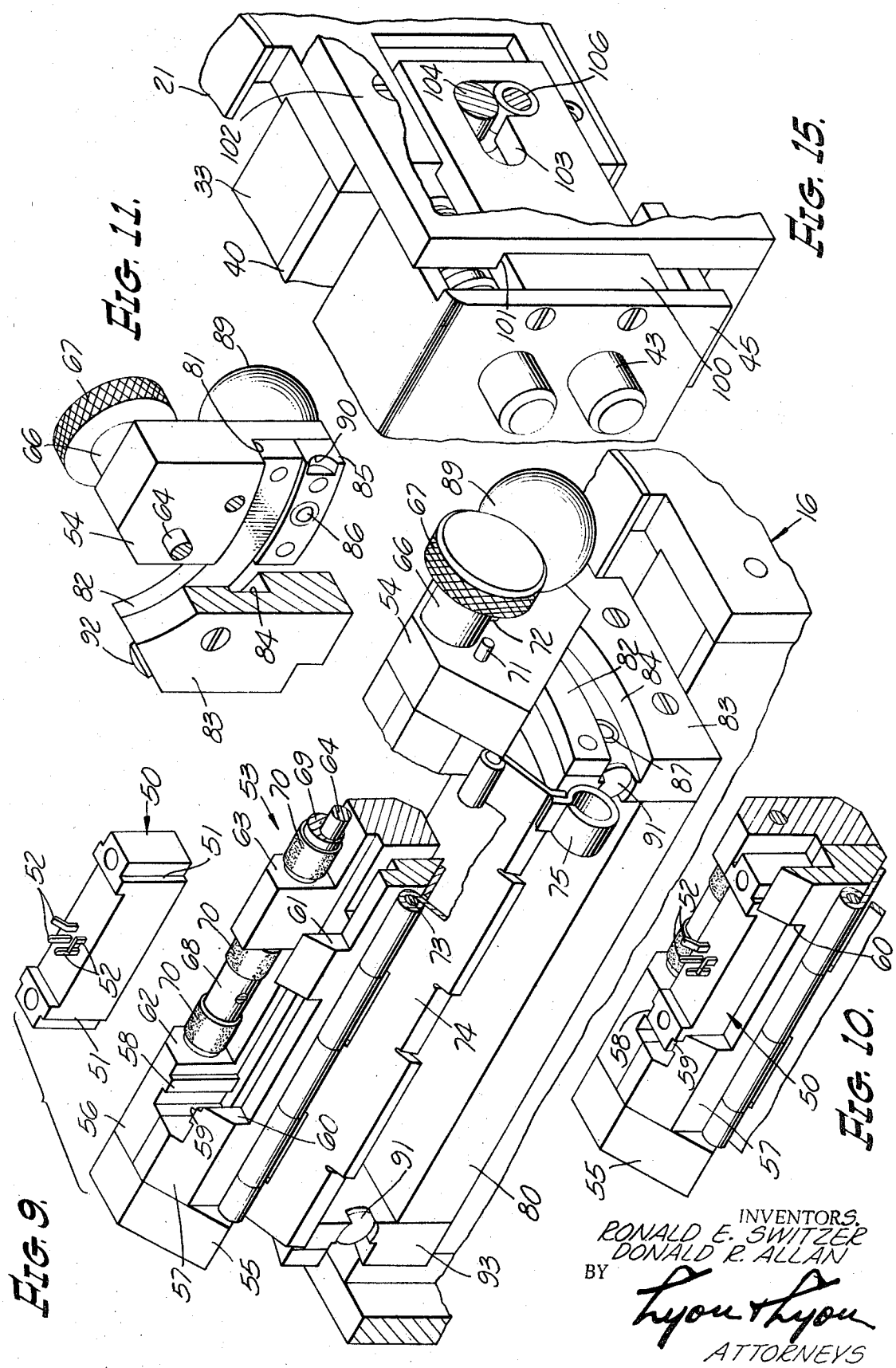

May 26, 1970 R. E. SWITZER ETAL 3,513,524
MULTI-CONDUCTOR HOLDING APPARATUS
Filed Aug. 14, 1967 6 Sheets-Sheet 6
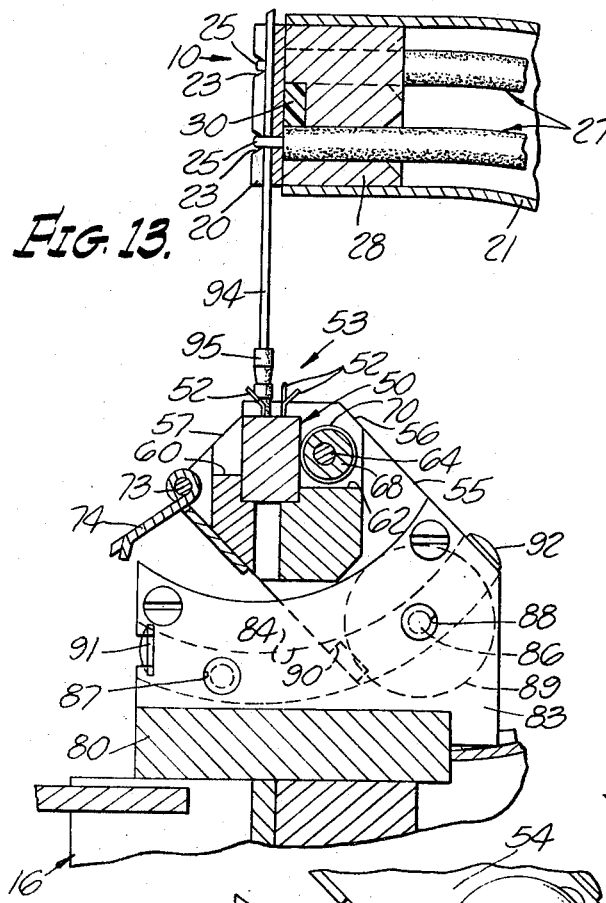
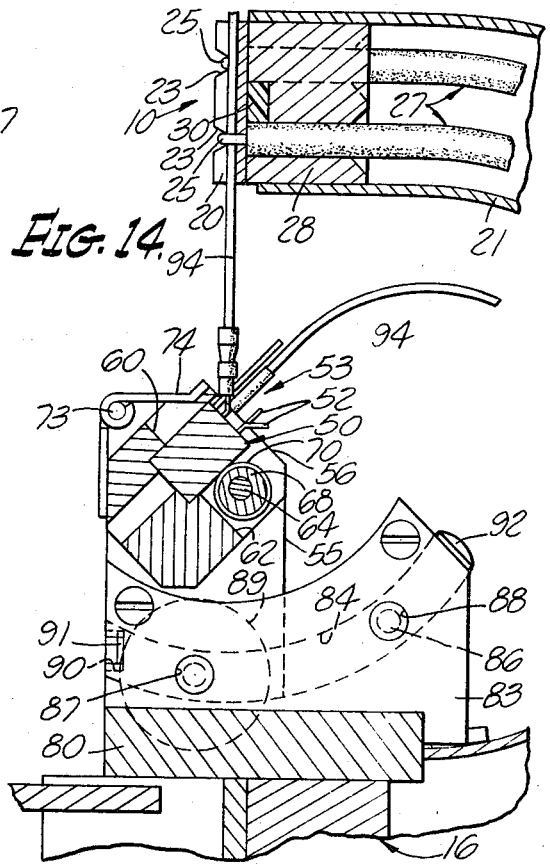
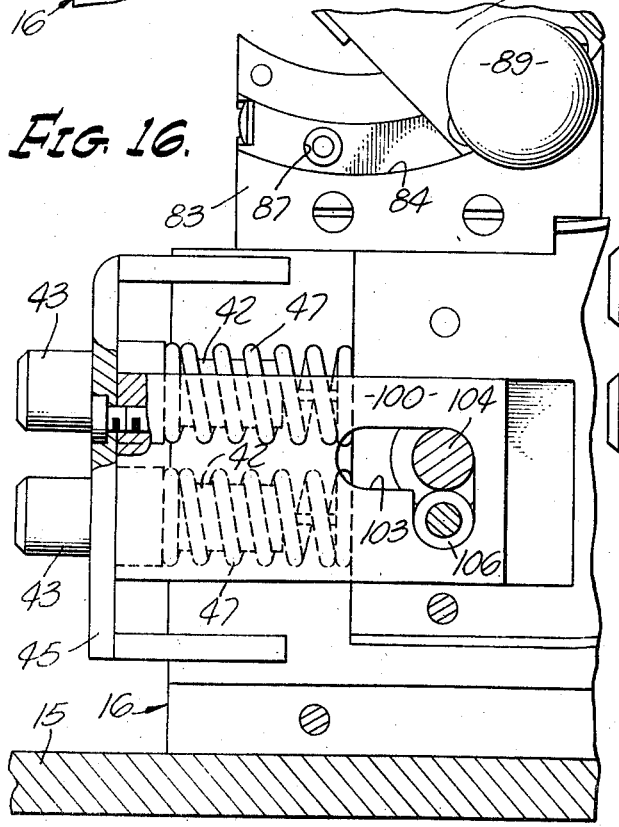
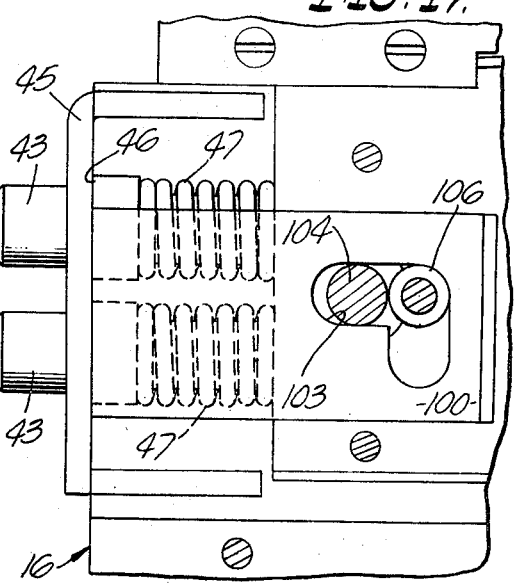
INVENTORS.
RONALD E. SWITZER
DONALD R. ALLAN
BY
Lyon & Lyon
ATTORNEYS

United States Patent Office 3,513,524
Patented May 26, 1970

3,513,524
MULTI-CONDUCTOR HOLDING APPARATUS
Ronald E. Switzer, Mountainview, and Donald R. Allan, Menlo Park, Calif., assignors to Raychem Corporation, Menlo Park, Calif., a corporation of California
Filed Aug. 14, 1967, Ser. No. 660,370
Int. Cl. H05k 13/00
U.S. Cl. 29—203
20 Claims

ABSTRACT OF THE DISCLOSURE

An apparatus for holding a plurality of conductors which are to be connected to the pins of a terminal block while the conductors are being associated with the appropriate pins and while the solder sleeves used to make a soldered connection are heated to above their heat recovery temperature. The apparatus is provided with a plurality of push button actuated hooks for holding each of the conductors in a given position with respect to the terminal block, and with a movable carriage for holding the terminal block and permitting it to be positioned in several different orientations with relation to the conductors.

BACKGROUND OF THE INVENTION

The problem of making multiple soldered connections to a connector or terminal block having a plurality of closely spaced pins has become more acute with increasing emphasis on miniaturization of all electrical components including such connectors and terminal blocks. As the pins on such blocks get closer together, it becomes more difficult to hand solder wires to the pins without creating shorting between the pins. The close spacing of the pins also can result in the soldering of one pine causing enough heat to be transferred to an adjacent pin to cause its soldered connection to be degraded. Moreover, and economically most important, the individual soldering of each pin requires great skill and is quite time consuming with the result that the completion of the wiring assembly is a relatively expensive process.

These problems have been met in large measure by the use of heat recoverable tubular members having a solder insert positioned therein. Such members are commonly called solder sleeves and when heated to above their heat recovery temperature, shrink down to firmly grasp the pin and the wire to be attached thereto. The heating also causes the solder insert to be melted to form a soldered connected between the pin and the conductor, the sleeving material controlling the flow of the solder and preventing it from being extruded from around the pin and thereby preventing shorting between the pins. Since the sleeve is fabricated of an insulating material, a complete soldered and insulating connection is formed. The use of such solder sleeves has permitted a number of soldered connections to be made simultaneously as the various pins, sleeves and conductors can be positioned in the correct manner and then a single heating cycle used to shrink all of the sleeves and melt the soldered inserts contained therein. However, the difficulty of positioning the various conductors, sleeves and pins and holding them in the proper orientation until the entire assembly is completed, and then during the heating cycle, has somewhat reduced the effectiveness of this technique. Moreover, any movement of the parts of the solder assembly prior to solidification of the solder is liable to result in a poor soldered connection.

SUMMARY OF THE INVENTION

According to the present invention, apparatus is provided which permits a plurality of conductors to be properly positioned relative to a connector or terminal block and held in position until the heating cycle is completed and the solder has resolidified. The apparatus also provides for the quick and simultaneous release of the conductors after the heating cycle so that the entire connection process is made even more rapid. The apparatus also provides a carriage for mounting the connector or terminal block, the carriage being movable relative to the apparatus for positioning and holding the conductors so that terminal blocks having pins extending at different angles can be conveniently handled by the apparatus. This feature makes it possible to always have each pin in axial alignment with its associated conductor before the final connection is made so that a good soldered connection is assured. By the use of the apparatus of the present invention, a great number of soldered connections can be made simultaneously with a minimum of time required for preheating coupling of the conductors to the connector or terminal block and post heating removal of the completed wiring assembly from the fixture. Since the apparatus is simple to operate the level of skill of the operator need not be high, and consequently the cost of the assembly process is considerably reduced.

As used herein, the term "terminal block" is not meant to be limited to any specific type of multiple pin connector or wire terminating device but rather is used in its broadest sense to include all electrical components having a plurality of pins to which different conductors may be connected.

BRIEF DESCRIPTION OF THE DRAWINGS

FIG. 2 is a front elevation of the apparatus of the present invention.

FIG. 3 is a sectional elevation view taken along lines 3—3 of FIG. 2.

FIG. 4 is a front elevational view, partly broken away and partly in section, of the apparatus of the present invention.

FIG. 5 is an enlarged detail view of the hook actuating mechanism of the present invention.

FIG. 6 is an enlarged elevation view of the wire holding portion of the present invention.

FIG. 7 is a sectional detail taken along lines 7—7 of FIG. 6.

FIG. 8 is a perspective view, partly in section, of the wire holding portion of the present invention with the hooks thereof extended.

FIG. 9 is an exploded perspective view, partly broken away, of the terminal block supporting carriage mechanism of the present invention;

FIG. 10 is a perspective view of a portion of the carriage mechanism with a typical terminal block positioned therein.

FIG. 11 is a perspective view, partly in section, of the carriage moving mechanism of the present invention.

FIG. 12 is a detail view, partly in section, of the carriage locking mechanism of the present invention.

FIG. 13 is a side elevation showing the carriage mechanism in a first position.

FIG. 14 is a side elevation showing the carriage mechanism in a second position.

FIG. 15 is a perspective view, partly broken away, showing the quick release mechanism of the present invention.

FIG. 16 is a side elevation, partly in section, showing the hook actuating mechanism prior to a quick release action.

FIG. 17 is an elevation view, partly in section, showing the hook actuating mechanism during a quick release operation.

DESCRIPTION OF THE INVENTION

Figure 1:
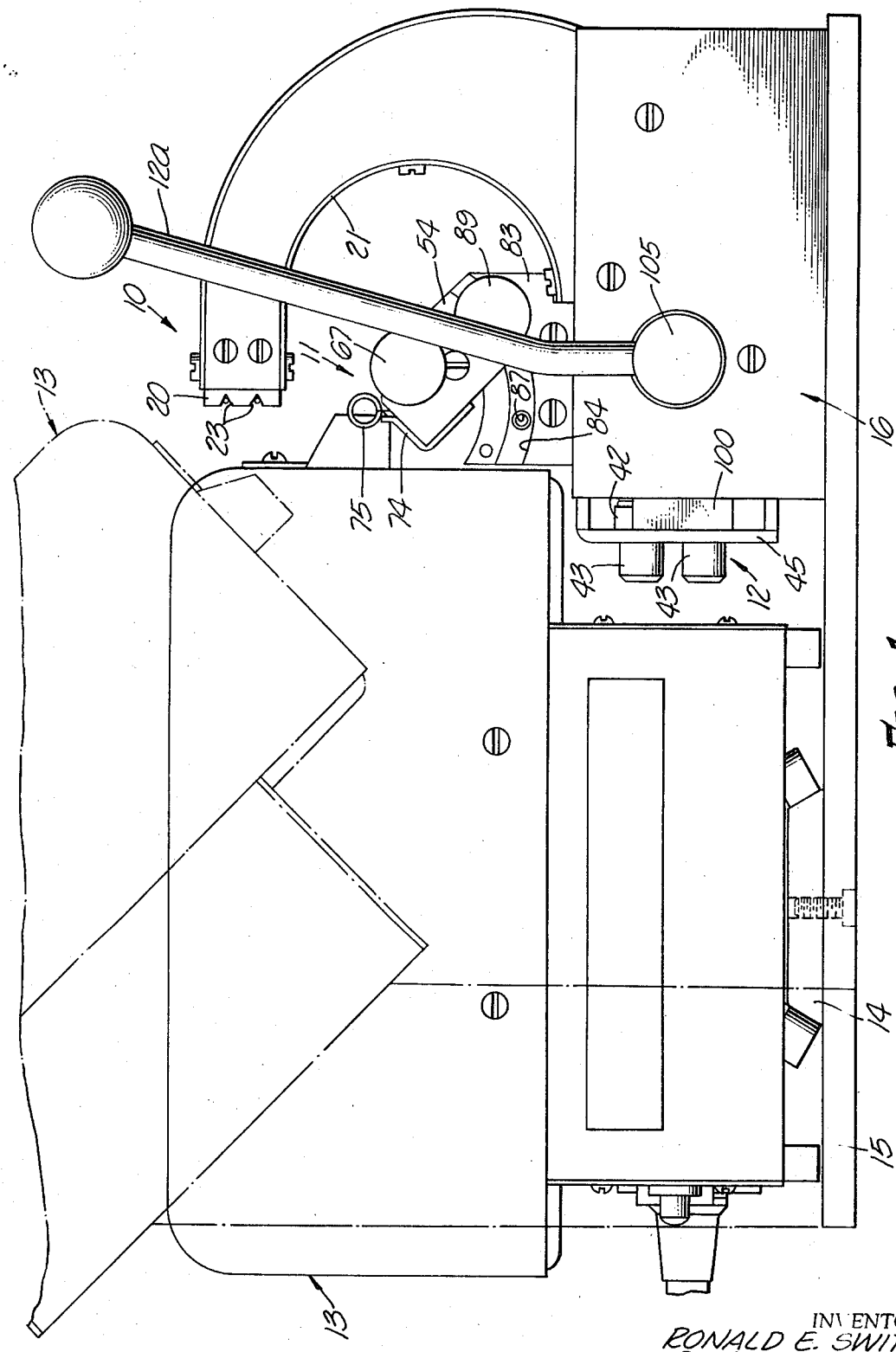
FIG. 1 is a side elevation view of the apparatus of the present invention shown in combination with a heater for use therewith.

To briefly describe the apparatus of the present invention in connection with FIGS. 1 and 2, the apparatus includes a conductor holding mechanism 10, a carriage 11 for holding the terminal block to which the connections are to be made, a push button console 12 for selectively actuating the individual components of the wire holding mechanism 10 and a mechanism actuated by the lever 12a for simultaneously releasing all of the wire holding mechanisms, namely, a plurality of hooks. The apparatus is used in cooperation wtih a heater 13, shown in FIG. 1, which can be a hot air heater, induction heater or other means but preferably heats by means of infrared radiation. If desired, mounting means may be provided that permits the heater 13 to be tilted relative to the carriage 11 so that the radiation from the heater may be caused to impinge on the carriage from different angles (as shown in phantom in FIG. 1). The heater is preferably positioned on a guide 14 provided on a platform 15 on which the base housing 16 of the apparatus of the present invention is also mounted.

The conductor grasping and holding mechanism 10 is shown in greater detail in FIGS. 3, 4, 6, 7 and 8. As shown in these figures, a plate 20 is mounted on a curved housing 21 attached to the base 16 and is provided with a plurality of vertical V-shaped grooves or slots 22. The vertical grooves 22 are intersected by a pair of horizontal grooves or slots 23. The plate 20 is provided with a plurality of apertures 24 therein through which extend hooks 25. As can best be seen from FIGS. 6 and 7, the apertures 24 are formed in the islands 26 between the grooves 22 of the plate 20 at the points where the horizontal grooves 23 intersect these grooves. The apertures 24 are staggered, that is, one communicates with the upper horizontal groove 23 through every other island 26 while the apertures 24 which communicate with the lower horizontal groove 23 are made in alternate islands 26 so that only one hook 25 extends over a single vertical groove 22. In this manner, a single conductor can be placed in each groove 22 and held in position by the hook 25 associated therewith. The hooks 25 are moved away from the plate 20 by means of flexible cables 27 which are actuated by the push buttons of the console 12. Although only two rows of hooks are illustrated, any desired number can be used.

The mechanism for causing movement of the hooks 25 can best be seen from FIGS. 3, 4 and 5. The upper end of the curved housing 21 adjacent the plate 20 is provided with a block 28 having a plurality of passageways 29 therein through which the flexible cables 27 are passed. A strip of material 30 of plastic, rubber or the like is positioned between the upper and lower rows of cables 27 to anchor and prevent lateral motions to which they may be subject. The housing 29 is also provided with a block 31 having an opening 32 through which the cables 27 pass and by which they are maintained in place.

The curbed housing 21 is mounted in any suitable fashion to the base housing 16 and the cabels 27 pass from one to the other. The base 16 is provided with a block 33 having a plurality of passageways 34 therein for receiving the lower end of the cabels 27. Each of the passageways 34 is provided with a disc or washer 35 which acts as an anchor at this end of the cable. As can be seen from FIG. 5, the cables 27 comprise an actuating wire 36 which slides inside a lubricating sleeve 36a, for example, of Teflon, around which is positioned a helically wound wire 37 to give the cable the desired stiffness. A covering 38 of a suitable plastic material encases the wires 36 and 37.

The actuating wire 36 of the cable 27 extends through an opening 39 in a plate 40 in the base 16. The wire 36 then passes into an axial passageway 41 in a cylindrical block 42 and is held in place therein by being passed around a pin 42a so that the wire 36 will move within the lubricating sleeve 36a when the block 42 is moved in the direction of the plate 40. The block 42 is screw-threaded into a push button 43 which passes through an opening 44 in the front plate 45 of the console 12. Each push button 43 is provided with a shoulder 46 which is urged into engagement with the plate 45 by means of a spring 47 which also bears against the plate 40. The push button 43 is thus biased in an outward direction with the result that the hook 25 is retracted in the slot 22. When a push button 43 is depressed against the force of its spring 47, the associated wire 36 moves within the sleeve 36a and causes its hook 25 to be extended so that a conductor can be positioned in its respective slot 22. When the push button 43 is released, the conductor will be grasped by the hook 25 and held in place in the groove 22.

The carriage assembly for positioning a terminal block is best shown in FIGS. 9, 10, 11 and 12. As shown in FIG. 9, a typical terminal block 50 is provided with shoulders 51 on either end thereof and with a pair of rows of terminal pins 52 extending from the upper surface thereof. As shown, each alternate pin is oriented in a vertical direction while the other pins are positioned at 45° on either side of the vertical. As pointed out previously, in order to make a reliable soldered connection to the terminal pins 52, it is desired that the pins be axially aligned with the conductors to which they are to be soldered and not at an angle thereto. This problem has been resolved according to the present invention by making the carriage assembly capable of being moved relative to the conductor holding mechanism 10 so that the terminal pins 52 can be successively axially aligned with the conductors to which they are to be connected.

The carriage assembly generally indicated at 53, comprises a pair of end plates 54 and 55 and a pair of terminal block supporting members 56 and 57 which are fastened to the end plates 54 and 55 in any suitable manner. As shown, the members 56 and 57 are constructed to accommodate two terminal blocks of the type shown. For this purpose, the members 56 and 57 are respectively provided at each end with shoulders 58 and 59 which serve to register the shoulders 51 at either end of the blocks 50 as shown in FIG. 10. The member 57 is provided with cutout portions 60 and 61 which permit easier access to the terminal blocks 50 and the terminal pins 52 thereof. The member 56 is provided with cutout portions 62 and 63 which correspond to the cutouts 60 and 61 of the member 57.

As shown in FIG. 4, a shaft 64 passes through the member 56 and bridges the cutouts 62 and 63. The shaft 64 is held in place at one end by a boss 65 and at the other by a boss 66 which is provided with a knob 67, rotation of which causes rotation of the shaft 64. Eccentrically mounted on the shaft 64 in the cutout portions 62 and 63 are cylinders 68 and 69 on which are mounted rings 70 of a suitable material for engaging the terminal blocks 50 without damaging them. When the terminal blocks are positioned between the members 56 and 57, the shaft 64 is rotated by the knob 67 causing the eccentrically mounted cylinders 68 and 69 to bring the rings into engagement with the terminal blocks and hold them firmly in place. The end plate 54 is provided with a pin 71 which cooperates with a pin 72 mounted on the boss 66 to limit movement of the shaft 64.

A shaft 73 is mounted between the end plates 54, 55 in front of the member 57 and has rotatably mounted thereon a generally L-shaped heat shield 74 which is provided with a ring 75 to permit easy movement thereof. After the terminal blocks 50 have been placed in position and all the conductors associated with the proper pins 52 thereof, the heat shield 74 is moved from the position shown in FIG. 9 or 13 to the position shown in FIG. 3 or 14 so as to shield the terminal blocks 50 from the radiation of the heater 13.

In order to permit the carriage assembly 53 to be moved from one position to another relative to the conductor holding mechanism 10, the end plates 54 and 55 are adapted for sliding movement on a framework 80 mounted on the housing 16. As can best be seen in FIGS. 9 and 11, the end plate 54 is provided with an arcuate slot 81 that cooperates with an arcuate guide 82 mounted on an upstanding plate 83 which makes up part of the framework 80. The plate 83 is also provided with a slot 84 through which may pass a block 85 mounted on the lower end of the end plate 54 and serving to form one side of the slot 81. The block 85 carries a detent 86 which may, for example, be spring-loaded (as shown in FIGS. 12 and 13) and cooperates with recesses 87 and 88 to maintain the end plate 54 and hence the carriage assembly 53 in a set position. To facilitate movement of the end plate 54, and hence the carriage assembly 53, a knob 89 is mounted on the end plate 54. The block 85 is provided with an indentation 90 which cooperates with a stop 91 on the plate 83 to limit clockwise movement of the carriage assembly 53. A similar stop 92 limits counterclockwise movement of the carriage assembly 53. The end plate 55 is constructed in an identical manner as the end plate 54 to cooperate with an upstanding plate 93 constructed in the identical fashion as the plate 83.

The variable relationship of the carriage assembly 53 and terminal block 50 with the conductor holding mechanism 10 is shown in FIGS. 13 and 14. In FIG. 13, the carriage assembly 53 has been moved as far as possible in tthe counterclockwise direction. It this position, the terminal block 50 and the inner rows of pins 52 are vertical so that each of these pins is in axial alignment with an electrical conductor 94 being held by the conductor holding mechanism 10 and with a solder sleeve 95 which will be used to form a soldered connection between the two.

When the carriage assembly 53 is moved as far as possible in the clockwise direction, the upper surface of the terminal block 50 is positioned at an angle of 45° with the vertical with the result that the forward most row of pins 52 are vertically oriented and are axially aligned with their respective conductors and solder sleeves.

In order to facilitate the quick and simultaneous release of all of the conductors 94 held by the hooks 25, the plate 45 through which the push buttons 43 protrude is made relatively movable with the base 16. For this purpose, the plate 45 is provided at either end with a laterally extending plate 100 which is slidable in a groove 101 formed in the side plates 102 of the base 16. The plate 100 is provided with an L-shaped slot 103. A shaft 104 extends through the slot 103 and is connected to a boss 105 from which the lever 12a extends. A roller 106 is also mounted on the boss 105 and is positioned within the slot 103.

FIGS. 15 and 16 show the position of the various elements when the lever 12a is positioned in its normal or non-actuated manner. When the lever 13 is pulled forward by the operator, the boss 105 and shaft 104 rotate with the result that the roller 106 is forced rearwardly, carrying the plate 100 with it. The position of the elements when the lever 12a is pulled all the way forward is shown in FIG. 17. Since the plate 45 engages the shoulders 46 of the push button, 43, the rearward movement of the plate 45 causes the push button 43 to be moved against the force of the springs 47. This has the same effect as if the individual push buttons were pushed, that is, the wires 36 are caused to move with the result that the hooks 25 are extended. The conductors held by the hooks 25 can then be simultaneously moved away from the conductor holding mechanism 10. In order that this movement of the plate 45 and the push buttons 43 is smooth, the shaft 104 is extended completely through the base 16 and is provided on its other end with a mechanism identical to that shown in FIG. 15, as can be seen from FIG. 4.

The operation of the apparatus is believed to be obvious from the foregoing description. In the preferred sequence of operations, the operator positions one or more of the terminal blocks 50 within the carriage assembly 53 and then rotates the knob 67 so that each of the blocks is held firmly in place. The carriage assembly 53 is placed in the position shown in FIG. 13. The individual conductors 94 and solder sleeves 95 are then properly positioned with respect to the vertical pins in the forwardmost line of pins 52 and the conductors 94 held in position by the hooks 25. After all of the individual conductors 94 are placed with the solder sleeves 95 and adjacent the pins 52 also within the solder sleeves the heat shield 74 is flipped into its protective position and the heater 13 is placed adjacent the apparatus. The heater 13 is then energized causing the heat recoverable members of the solder sleeves 95 to shrink around their associated conductors and pins and the solder inserts therein to flow and form a solder connection between the conductors and the pins.

The heater is then removed, the heat shield 74 flipped down and the lever 12a pulled forward after the solder has solidified to release all of the conductors 94. These terminated conductors are then pushed back into the space formed by the curved housing 21 and the carriage assembly 53 then moved to the position shown in FIG. 14. The same sequence is then followed for making connections to the angled pins in the forwardmost row. After the heating cycle and the solidification of the solder, the conductors 94 are released and the knob 67 is then turned to release the terminal block 50. The terminal block 50 is then removed from the carriage assembly 53 and turned around so that the row of terminated conductors extends into the space formed by the curved housing 21. The carriage assembly 53 is now moved back to the position of FIG. 13, connections made to the second set of vertical pins, and the carriage then moved to the position shown in FIG. 14 and connections made to the second set of angled pins. As can be seen, all of the necessary connections are made more quickly than has heretofore been possible and yet the skill required to make them is much less than ordinarily required for conventional soldering techniques or even that required when using solder sleeves where the present apparatus is not used.

The invention may be embodied in other specific forms not departing from the spirit or central characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. Apparatus for use in connecting a plurality of electrical conductors to a plurality of pins on a terminal block comprising:
   means adapted to releasably engage said terminal block;
   selectively operable means for individually holding each of said conductors relative to said means adapted to releasably engage said terminal block;
   said selectively operable means being positioned above said means to releasably engage said terminal block and comprising a plurality of hooks cooperating with a plate to grasp said conductors;
   means for individually operating said selectively operable means; and
   means for simultaneously operating all of said selectively operable means.

2. Apparatus for use in connecting a plurality of electrical conductors to a plurality of pins on a terminal block comprising:
   means for releasably engaging said terminal block;
   selectively operable means for individually holding or releasing each of said conductors;
   means mounting said selectively operable means adjacent to said means for releasably engaging said terminal block whereby said conductors can be positioned relative to said terminal block;

means connected to said selectively operable means for individually operating said selectively operable means to individually hold or release each of said conductors; and means connected to said selectively operable means for simultaneously operating all of said selectively operable means to collectively hold or release said conductors.

3. The apparatus of claim 2 wherein said selectively operable means comprise a plurality of grasping members positioned above said means adapted to releasably engage said terminal block.

4. The apparatus of claim 1 wherein said plate is provided with a plurality of vertically grooves adapted to receive said conductors, each of said hooks extending across one of said grooves.

5. The apparatus of claim 1 wherein said means for individually operating said selectively operable means comprises a plurality of depressable means each coupled to one of said hooks by a flexible cable.

6. The apparatus of claim 5 wherein said means for simultaneously operating all of said selectively operable means comprises a plate movable to simultaneously depress all of said depressable means.

7. The apparatus of claim 2 wherein said means adapted to releaseably engage said terminal block is movable relative to said selectively operable means whereby said means adapted to releasably engage said terminal block can assume different orientations with respect to said selectively operable means.

8. The apparatus of claim 7 wherein said means adapted to releasably engage said terminal block comprises a carriage slidably mounted on guide means, said carriage having an opening therein adapted to receive said terminal block, and means for clamping in said opening a terminal block inserted therein.

9. The apparatus of claim 8 wherein detent means are provided for positioning said carriage at predetermined points on said guide means.

10. The apparatus of claim 8 wherein there is provided a heat shield movable into proximity to said opening to protect a terminal block positioned therein.

11. The apparatus of claim 6 wherein said means adapted to releasably engage said terminal block is movable relative to said selectively operable means whereby said means adapted to releasably engage said terminal block can assume different orientations with respect to said plate and said hooks.

12. The apparatus of claim 11 wherein said means adapted to releasably engage said terminal block comprises a carriage slidably mounted on guide means, said carriage having an opening therein adapted to receive said terminal block, and means for clamping in said opening a terminal block inserted therein.

13. Apparatus for use in connecting a plurality of electrical conductors to a plurality of pins on a terminal block by means of solder sleeves, comprising:

a base;

a framework mounted on said base, said framework including a pair of spaced guides extending vertically from said base;

a carriage including a pair of members slidably mounted in said guides, said carriage having an opening in the upper portion thereof adapted to receive a terminal block and clamping means movable into said opening to hold in position a terminal block inserted into said opening;

a housing mounted on said base adjacent said framework and extending over said carriage;

a plate mounted on the extending end of said housing, said plate having a plurality of vertical grooves therein;

a plurality of hooks extending through said plate, each of said hooks overlying one of said grooves and adapted to grasp a conductor positioned therein;

plate means mounted on said base, said plate means having a plurality of push buttons extending therethrough;

means biasing said push buttons outwardly from said base; and a plurality of flexible cables, each of said cables passing through said housing and connecting one of said push buttons with one of said hooks whereby depression of one of said push buttons causes its associated hook to be moved away from said plate.

14. The apparatus of claim 13 wherein there is provided means operable to move said plate means relative to said base whereby all of said push buttons are simultaneously depressed and all of said hooks are moved away from said plate.

15. The apparatus of claim 14 wherein said means operable to move said plate means relative to said base comprises a member attached to said plate means and slidably mounted in said base, said member having an L-shaped slot formed therein, a shaft extending through said slot, an arm mounted on said shaft, and a roller mounted on said arm and positioned within said slot, movement of said arm about said shaft causing said roller to move said member and hence said plate means toward said base.

16. The apparatus of claim 15 wherein each of said push buttons is provided with a shoulder which engages the side of said plate means facing said base.

17. The apparatus of claim 16 wherein said means biasing said push buttons outwardly from said base comprises individual springs associated with each of said push buttons.

18. The apparatus of claim 14 wherein said clamping means comprises a shaft rotatably mounted in said carriage adjacent said opening, said shaft having rollers eccentrically mounted thereon whereby rotation of said shaft causes said rollers to be moved into said opening.

19. The apparatus of claim 14 wherein said members of said carriage are provided with detent means for positioning said carriage at points on said guide means such that pins on said terminal block extending at different angles therefrom can be positioned in axial alignment with said grooves.

20. The apparatus of claim 19 wherein said carriage is provided with a heat shield movable into proximity to said opening to protect a terminal block positioned therein.

References Cited

UNITED STATES PATENTS 2,390,139  12/1945  Vasseli _____ 29—25.19 X
3,321,825  5/1967  Cooke.

THOMAS H. EAGER, Primary Examiner

U.S. Cl. X.R.

228—6